REAL-TIME DETECTION OF LATCH RESOLUTION USING THRESHOLD MEANS

Filed Dec. 8, 1967 3 Sheets-Sheet 1

INVENTORS
ROBERT L. ADAMS
DOMENIC R. CASTALDO
GERALD W. KURZ

BY Nathan Cass
ATTORNEY

United States Patent Office 3,515,998

Patented June 2, 1970

3,515,998

REAL-TIME DETECTION OF LATCH RESOLUTION USING THRESHOLD MEANS

Robert L. Adams and Domenic R. Castaldo, Kingston, and Gerald W. Kurtz, Saugerties, N.Y., assignors to International Business Machines Corporation, Armonk, N.Y., a corporation of New York Filed Dec. 8, 1967, Ser. No. 689,140

Int. Cl. H03k 3/12

U.S. Cl. 328—206 15 Claims

ABSTRACT OF THE DISCLOSURE

A logical circuit arrangement including a latch responsive to asynchronous input signals and "real-time" threshold detection means associated therewith for sensing the actual resolution of the latch during operation. The "real-time" threshold means operate to permit propagation of the latch output as soon as actual resolution of the latch is obtained, whereby latch instability problems which can lead to intermittent errors are solved without degrading system operating speeds.

BACKGROUND OF THE INVENTION

This invention relates generally to logical switching circuits and more particularly to the solution of instability problems which may occur for bistable logic devices operating in an asynchronous environment.

As the speed of operation of computers increases, the time required for a bistable device, such as a latch, to switch from one state to another can no longer be neglected. Furthermore, it is not unusual for a high speed latch, under certain conditions, to maintain an unstable state for a significant period of time in relation to computer operating speeds. Where the computer operating speed is relatively low, or where synchronous operation is provided, the presence of such unstability is either negligible or can be relatively simply handled by proper design in a manner which does not deleteriously affect overall operating speed. However, in high speed asynchronous computer applications, instability can present a significant problem which can be severely detrimental to the reliability of system performance.

One such problem presented in a high speed asynchronous computer system may be illustrated by considering a typical example. It will be assumed that an AND gate is provided at the input to a latch and that the AND gate is responsive to two asynchronous input signals. Because they are asynchronous, it will be understood that the two signals to the AND gate may change at any time relationship with respect to one another. From the viewpoint of probability considerations, it is to be expected that the two signals will normally change at sufficiently different times with respect to one another so that the latch output may be considered resolved and logically useable after a period of instability whose duration is based on the normal circuit delay time. It will be understood, however, that, although the above assumption will be correct most of the time, there still is a very small probability, for example, once every few billion cycles, that the two signals applied to the AND gate will both change in opposite directions at a sufficiently close time with respect to one another so that a partial signal is applied to the latch which causes the latch to remain in an unstable state in which it is neither "on" or "off" for a much longer period than normal, for example, five to six times greater than the normal circuit delay period. This instability comes about, for example, when the partial input signal applied to the latch equals the unity gain voltage level of the closed feedback loop, resulting in a steady state "hang-up" at the unity gain voltage level which will remain until the circuit is caused to be stabilized, such as by a disturbance or variation in loop gain. The consequence of the occurrence of this longer than usual period of instability is an unstable latch output which, if permitted to propagate to other logic, could result in one or more errors being produced, the cause of which would be undetectable. For example, an unstable latch condition may cause the latch output to appear to be "on" and, if permitted to propagate, could perform improper logic functions, after which the latch could settle in the "off" state.

One possible solution to the above described problem of latch instability is to prevent propagation of a latch output for a sufficient time period until it can be assured that the latch output is stable, taking into account all possible relationships between the asynchronous input signals including the above described "hang-up" situation. This solution, while solving the problem, is particularly undesirable and practically unuseable, since it would greatly slow up operating speed for all cycles just to solve the problem for the rare cycles for which the hang-up problem occurs.

SUMMARY OF THE INVENTION

In accordance with the present invention, a particularly advantageous solution to the problem of latch instability is provided by employing "real-time" threshold detection to sense the actual logical resolution of a latch each time it operates and permitting propagation of the latch output when actual resolution of the latch occurs. The important advantage of this solution is that the operating speed of the system is only slowed down for those rare times when the latch instability problem occurs, the system operating at normal speeds otherwise. The present invention, therefore, solves the latch instability problem without degrading overall operating speeds. In fact, an improvement in overall operating speed is possible since, if latch resolution occurs faster than normal, the real time detection of this resolution will permit the latch output to be propagated sooner.

It is accordingly a broad object of the invention to provide means and methods for improving reliability in high speed asynchronous computer systems.

Another object of the invention is to provide means and methods for overcoming instability problems occurring in asynchronously operated high speed logical circuits without degrading operating speeds.

A further object of the invention is to provide means and methods for detecting the resolution of a logical circuit in "real-time."

Yet another object of the invention is to provide means and methods for preventing the occurrence of intermittent errors in high speed asynchronous computer systems.

A still further object of the invention is to provide an improved control register employing latches having associated "real-time" threshold detection means.

The foregoing and other objects, features and advantages of the invention will be apparent from the following more particular description of a preferred embodiment of the invention, as illustrated in the accompanying drawings.

In the drawings:

FIG. 1 schematically illustrates a typical known latch having input signals applied thereto via an input AND gate.

Like designations refer to like element throughout the figures of the drawings.

Figure 1:
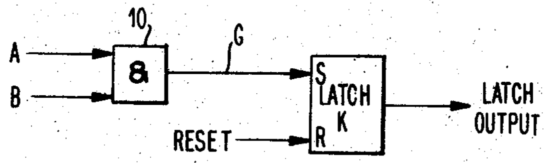
Figure 2:
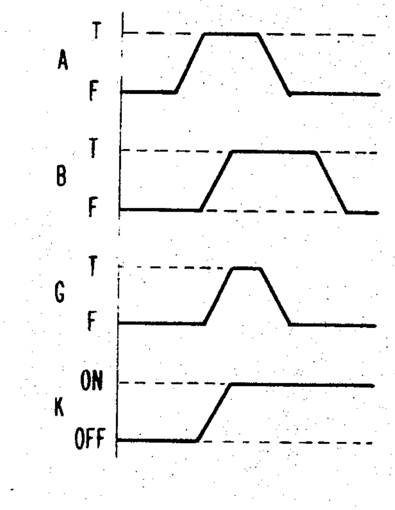
FIGS. 2–4 are timing diagrams illustrating normal and unstable latch operation for the latch of FIG. 1.
Figure 3:
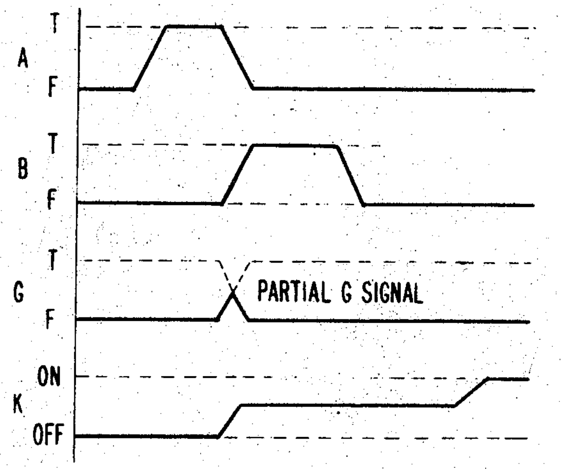
Figure 4:
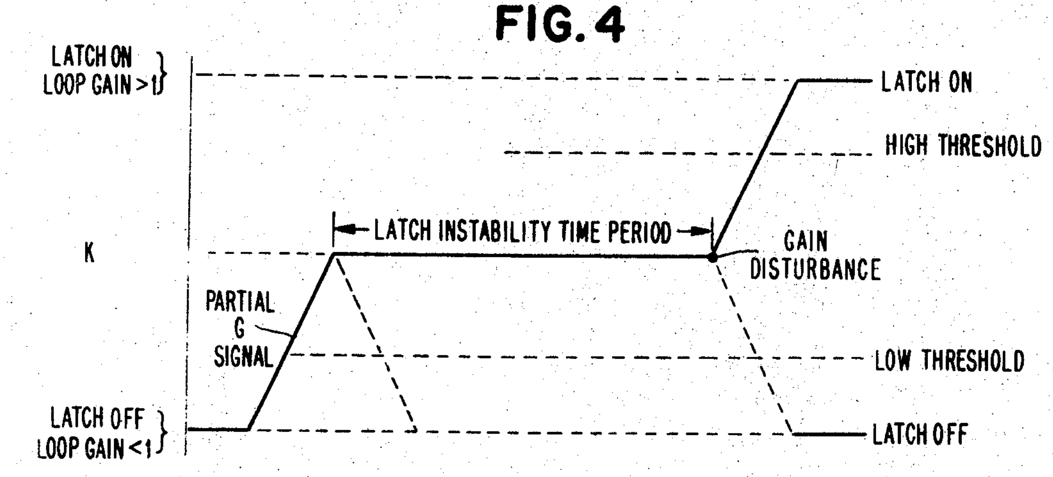

As background for the description of the exemplary embodiment to follow, reference is initially directed to the known latch circuit of FIG. 1 which will be considered along with the timing diagrams of FIGS. 2–4 in order to illustrate the latch instability problem which the present invention overcomes. In a known manner, latch K in FIG. 1 has set and reset inputs S and R. Asynchronous input signals A and B, each having a true or false logical level T or F, are applied to the set input of latch K via an input AND gate 10. When the output G of AND gate 10 is at a true logical level, latch K is switched "on," causing the latch output to become true. A reset signal applied to the latch reset input R will turn the latch "off" causing the latch output to become false.

The timing diagram of FIG. 2 illustrates the normal situation where the input signals A and B occur at sufficiently different times so that the output signal G from AND gate 10 turns latch K "on" in the normal manner with a normal circuit delay. On the other hand, the timing diagram of FIG. 3 illustrates the rare, very low probability situation where signals A and B change in opposite directions at substantially the same time so that the output G from AND gate 10 is a partial G signal which is at neither a true or false logical level, but has an amplitude somewhere in between. If this partial G signal is at the unity gain voltage level of latch K, as illustrated in graph K of FIG. 3, which is shown enlarged and in more detail in FIG. 4, then the latch will hang up in an unstable condition between its "on" and "off" states for indeterminent time period until it finally settles in either an "on" or "off" state. As previously mentioned earlier here, this indeterminent time period of latch instability may be much greater than the normal circuit delay time, and could result in providing errors if the latch output is permitted to propagate to other logic before the latch stabilizes.

Figure 5:
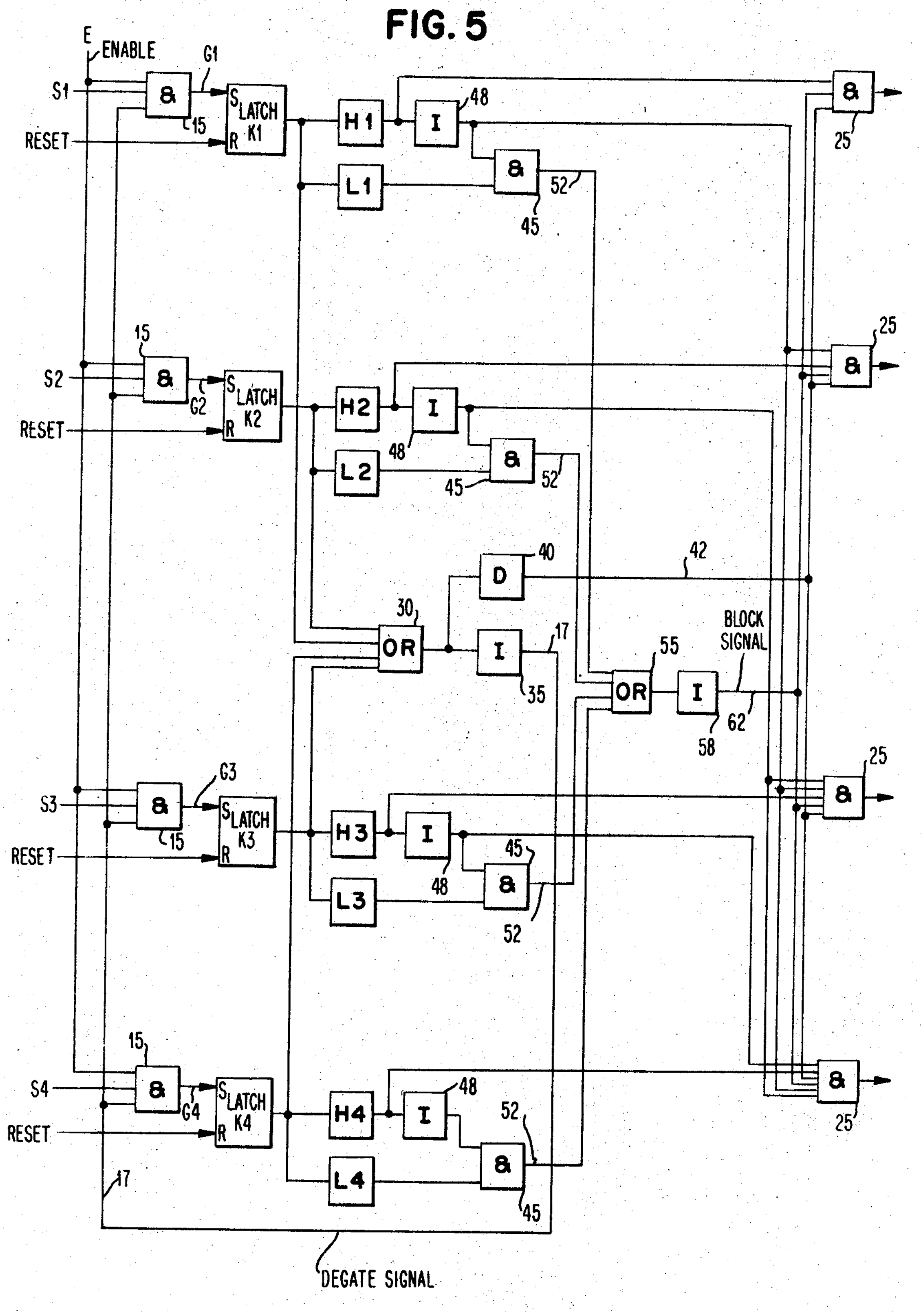
FIG. 5 is a schematic electrical diagram of a control register circuit incorporating the invention.
Figure 6:
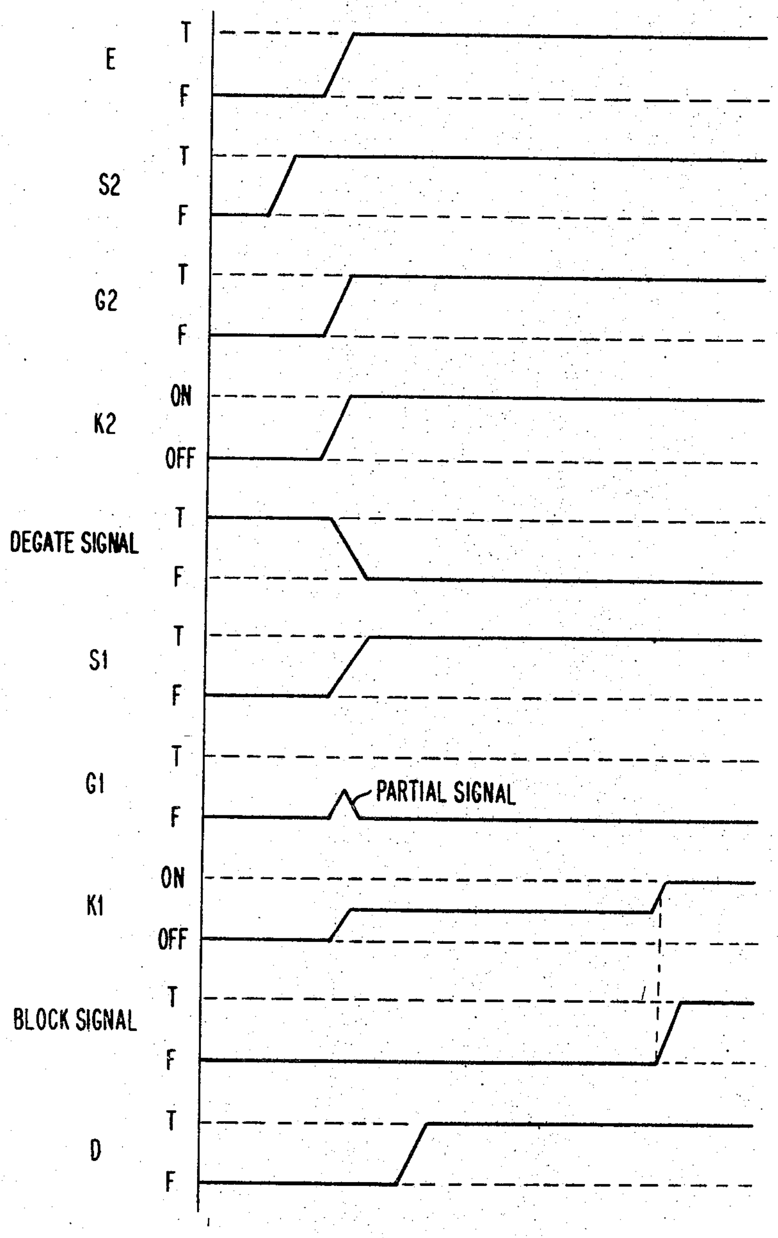
FIG. 6 is a timing diagram illustrating a typical example of the occurrence of latch instability in the circuit of FIG. 4 and the manner in which the latch instability problem is overcome in accordance with the invention.

The manner in which the present invention overcomes the above described problem of latch instability will be illustrated for the control register shown in FIG. 5. The The timing diagram of FIG. 6 illustrates the relationship between pertinent signals in FIG. 5. The control register in FIG. 5 may typically be used to group asynchronously occurring service request signals S1, S2, S3 and S4 from respective input-output devices into batches for appropriately feeding priority logic (not shown). Although only the four signals S1, S2, S3 and S4 are illustrated in FIG. 5, it is to be undertood that many more are usually provided; however, four will be sufficient to illustrate the application of the present invention.

Ignoring the details of the present invention for a moment, the basic operation of the embodiment of FIG. 5 is such that, at a given instant of time, an enable signal E becomes true to cause those of service request signals S1 to S4 which are true to set respective latches K1 to K4 via respective input AND gates 15. If at least one of latches K1 to K4 is turned "on," a false degate signal is produced on line 17 to inhibit AND gates 15, and thereby prevent later occurring service request signals from affecting the states of latch K1 to K4. The states of the latches will then constitute a batch, a request for service being indicated by a respective one of latches K1 to K4 being "on."

Typically, latch K1 may have the highest priority followed by latches K2, K3 and K4, in which case, if all four latches are "on" in the batch, servicing will be in the order of K1, K2, K3 and K4. This priority is achieved in the control circuit of FIG. 5 by applying the inverted output of latch K1 to the respective output gates 25 of latches K2, K3 and K4, the inverted output of latch K2 to the respective output gates 25 of latches K3 and K4, and the inverted output of latch K3 to the output gate 25 of latch K4. After a service request receives service, its respective latch is reset so as to remove the inhibiting effect from lower priority output AND gates 25, thereby providing for service in accordance with the required priority.

The effect of the latch instability problem on the above described operation of FIG. 5 is shown by the example illustrated in the timing diagram of FIG. 6. In the example illustrated in FIG. 6, signal S2 is true when enable signal E becomes true, causing a true signal G2 to be applied via the respective input AND gate 15 to turn latch K2 "on," which in turn causes a false degate signal to be produced on line 17 via common OR gate 30 and inverter 35 to inhibit input AND gates 15 and thereby form the batch.

However, as illustrated in FIG. 6, it is possible that signal S1 may switch true just as the degate signal is switching false. As a result, a partial G1 signal appears at the output of the respective input gate 15 which when fed to latch K1 could produce the latch instability previously described in connection with FIG. 4. One difficulty arising if this latch instability in latch K1 should occur in the circuit of FIG. 5 is that, if the additional structure of the present invention were not provided, latch K1 might appear to be "off" during its unstable period so as to permit the respective output AND gate 25 for latch K2 to be enabled, and thereby cause servicing to be initiated by the "on" state of latch K2. If prior to the completion of the servicing initiated by the "on" state of latch K2, latch K1 which has a higher priority should settle into its "on" state, then output AND gate 25 of latch K2 will unexpectedly be inhibited and the servicing initiated thereby improperly interrupted, possibly causing errors. Further complicating the situation is that this late turning "on" of latch L1 could result in the initiation of servicing of latch L1 in the middle of the servicing of latch L2, also possibly leading to errors. Other potential problems which might occur as a result of latch instability will also be apparent to those skilled in the art.

From the previous discussion of the latch instability problem in connection with FIGS. 2–4, it will be evident that one way of handling the latch instability problem in the circuit of FIG. 5 is to inhibit output gates 25 following the turning "on" of one or more latches for a time period which is long enough for all latches to have been resolved for the worst possible condition of latch instability. This could be accomplished in FIG. 5, for example, by providing a delay circuit 40 connected to the output of OR gate 30 whose output 42 inhibits AND gates 25 for the worst-case time required for all latches to resolve, taking into the account the possible occurrence of the latch instability condition illustrated in FIG. 4. As will be apparent from the previous discussion in connection with FIGS. 2–4, such a solution is highly undesirable, since it would slow up every cycle and thus unduly slow up overall system operating speed just to handle the rarely occurring latch instability condition.

The manner in which the provision of real-time threshold detection means in accordance with the present invention eliminates the difficulties arising from latch instability without slowing down overall system operating speed will now be described by showing how the invention is applied to the embodiment of FIG. 5. It will be seen in FIG. 5 that the output of each of latches K1, K2, K3 and K4 is coupled to a respective pair of high and low threshold circuits H1 and L1, H2 and L2, H3 and L3, and H4 and L4 which may be of conventional form. Each of the low threshold circuits L1, L2, L3 and L4 provides a true output signal when its respective latch output applied thereto is above the low threshold level indicated in FIG. 4, and a false output signal when its respective latch output is below the low threshold level. Each of the high threshold circuits H1, H2, H3 and H4 provides a true output signal when its respective latch output is above the high threshold level indicated in FIG. 4 and a false output signal when its respective latch output is below the high threshold level. Accordingly, when a latch is "off," its respective low and high threshold circuits both provide false outputs, and when a latch is "on" its respective low and high threshold circuits both provide "true" outputs; when a latch is in an unstable condition, its respective low and high threshold circuits provide true and false outputs, respectively.

It will be understood that each pair of threshold circuits in FIG. 5 may thus be used to provide an output signal 52 which indicates that its respective latch is in an unstable condition. This is accomplished in FIG. 5 by applying the output of each low threshold circuit to a respective AND gate 45 along with the output of each respective high threshold circuit applied to AND gate 45 via an inverter 48. The output 52 of each AND gate 45 will therefore be true whenever its respective latch is in an unstable condition—that is, when its respective low threshold circuit is true and its respective high threshold circuit is false, so that both inputs to the respective AND gate 45 are true.

Outputs 52 of AND gates 45 are used to prevent outputting of any of latches K1 to K4 if an unstable latch condition exists for any latch. This is accomplished by applying outputs 52 to a common OR gate 55 whose output is applied to inverter 58 to provide a block signal 62 which is in turn applied to output AND gates 25, whereby output AND gates 25 are inhibited whenever any of latches K1 to K4 is unstable. This is illustrated by the block signal graph in FIG. 6 which will be seen to remain false until latch K1 rises above the high threshold level (FIG. 4) on its way to a stable "on" condition.

As illustrated in FIG. 5, the output of each high threshold circuit is used as the output for its respective latch and is applied to the respective output AND gate 25 for this purpose. Any intermediate latch output signal produced, for example, by latch instability will thus not affect the operation of output AND gates 25 or any other logic following. Since the threshold circuits and associated logic serve to inhibit output AND gates 25 until all latches are resolved (that is, have become stable), delay 40 in FIG. 5 may advantageously be chosen, as illustrated in graph D in FIG. 6, to provide an appropriate minimum delay between the switching "on" of a latch and outputting via output AND gates 25.

It will now be evident that outputting via AND gates 25 will be inhibited beyond the minimum delay provided by delay 40 only when required by the actual existence of a latch instability condition. Accordingly, since the excessive period of latch instability illustrated in FIG. 4 has a very low probability of occurring, the extra delay provided for the rare times it does occur has a negligible effect on overall operating speed.

In summary, the operation of the circuit of FIG. 5 is such that, when enable signal E enables input AND gates 15 to form a batch, latches K1 to K4 will be set in accordance with respective service request signals S1 to S4. Degate signal 17 is produced via OR gate 30 and inverter 35 in response to the turning "on" of any latch so as to fix the contents of the batch by inhibiting input AND gates 15 to prevent any later occurring service requests from affecting latches K1 to K4. Delay 40 inhibits output AND gates 25 for an appropriate minimum delay time, while the H and L threshold circuits operating via AND gates 45 and common OR gate 55 and inverter 58 provide any additional delay which may be required by actually existing conditions of latch instability. Servicing then occurs in the order of priority provided as a result each of high priority latch inhibiting the output AND gates 25 of lower priority latches until reset after servicing thereon is completed.

While the invention has been particularly shown and described with reference to a preferred embodiment thereof, it will be understood by those skilled in the art that various changes in form and details may be made therein without departing from the spirit and scope of the invention.

What is claimed is:

1. In an electrical circuit arrangement,
a switchable bistable device having an output indicative of the state thereof,
means for applying asynchronously occurring input signals to said device for switching the logical state thereof,
real-time threshold means responsive to the output of said bistable device,
and means responsive to said real-time threshold means for inhibiting propagation of said output when said device is unstable.

2. The invention in accordance with claim 1,
wherein said bistable device operates in response to said input signals to provide a relatively high or low output logical level,
wherein said real-time threshold means includes first and second threshold means for detecting different values of said output logical level for determining the stability of said device,
and wherein said means responsive to said real-time threshold means is constructed and arranged to generate an inhibiting signal when said bistable device is unstable.

3. The invention in accordance with claim 2,
wherein said bistable device is a latch having a closed feedback loop, said latch being subject to a significantly greater than normal period of instability when the input signal amplitude is at the unity gain voltage level of the closed feedback loop of the latch.

4. In an electrical circuit arrangement,
a switchable bistable device,
output gating means through which the output of said bistable device is propagated,
and threshold means coupled to said bistable device and said output gating means for inhibiting said output gating means when the output of said bistable device has not settled into one of its bistable states.

5. The invention in accordance with claim 4, wherein said threshold means includes
first threshold means operable when the output of said device is within the vicinity of one of its bistable output levels,
second threshold means operable when the output of said device is within the vicinity of the other of its bistable output levels,
and logical circuit means coupled to the outputs of said first and second threshold means for inhibiting said output gating means when the output of said bistable device is not in the vicinity of either of its bistable output levels.

6. The invention in accordance with claim 5,
wherein said bistable device is a latch providing a relatively high or low output logical level in response to an input signal applied thereto,
wherein said first threshold means produces a first output logical level when said latch output rises above a first predetermined level on its way to a stable state at said high logical level and a second output logical level when said latch output is below said first threshold predetermined level,
and wherein said second threshold means produces said second output logical level when said latch output falls below a second predetermined threshold level on its way to a stable state at said low logical level and said first output logical level when said latch output is above said second predetermined level.

7. The invention in accordance with claim 6,
wherein said logical circuit means includes means responsive to the output logical levels of said first and second threshold means for generating an inhibiting signal when said first threshold means provides said second output logical level and said second threshold means provides said first output logical level.

8. The invention in accordance with claim 6, wherein said latch has a closed feedback loop and is subject to a significantly greater than normal period of instability when the input signal amplitude is at the unity gain voltage level of the closed feedback loop of the latch, and wherein said first predetermined threshold level is between said unity gain voltage level and said high output logical level and said second predetermined threshold level is between said unity gain voltage level and said low output logical level.

9. In an electrical circuit arrangement, a plurality of switchable bistable devices each having an output indicative of the state thereof, real-time threshold means responsive to the outputs of said bistable devices for detecting the stability thereof, and means responsive to said real-time threshold means for inhibiting propagation of the outputs of all bistable devices when any one is unstable.

10. The invention in accordance with claim 9, wherein said bistable devices are latches each providing a first or second output logical level in response to an input signal applied thereto, and wherein said real-time threshold means includes first and second threshold circuits provided for each latch for determining the stability of the latch by detecting the relationship of the latch output with respect to said first and second output logical levels.

11. The invention in accordance with claim 10, wherein said real-time threshold means also includes output gating means to which the outputs of said latches are coupled, and means coupled to the outputs of the first and second threshold circuits of each latch for providing an inhibiting signal to said output gating means when said threshold circuits indicate that any of said latches is unstable.

12. In an electrical circuit arrangement, a plurality of switchable bistable devices each providing an output indicative of the "on" or "off" state thereof, input gating means for applying asynchronously occurring input signals to said bistable devices for setting said devices to their "on" states, means coupled to the outputs of said bistable devices for inhibiting said input gating means when any of said devices is in its "on" state, output gating means to which the outputs of said bistable devices are coupled, real-time threshold means responsive to the outputs of said bistable devices for detecting the stability thereof, and means responsive to said real-time threshold means for inhibiting said output gating means to prevent propagation of the outputs of all of said bistable devices when any of said bistable devices is unstable.

13. The invention in accordance with claim 12, wherein each bistable device is a latch, and wherein said real time threshold means includes first and second threshold circuits provided for each latch for determining the stability of the latch by detecting whether the latch has settled to its "on" or "off" state, and logical circuit means coupled to the outputs of said threshold circuits for providing an inhibiting signal to said output gating means in response to said threshold circuits indicating that a latch is unstable.

14. The invention in accordance with claim 13, wherein said output gating means includes an output gate for each latch to which the respective latch output is coupled and to which said inhibiting signal is applied, and wherein the outputs of predetermined ones of said latches are applied to predetermined ones of said output gates in an inhibiting manner for establishing a priority order for outputting of the "on" states of said latches.

15. The invention in accordance with claim 13, wherein the output of each latch is coupled to said output gating means via one of its respective first and second threshold circuits.

References Cited

UNITED STATES PATENTS

| | | | |
|---|---|---|---|
| 3,247,399 | 4/1966 | Moody | 307—247 XR |
| 3,290,520 | 12/1966 | Wennik | 307—235 |
| 3,327,230 | 6/1967 | Konian | 328—117 XR |
| 3,444,470 | 5/1969 | Bolt et al. | 307—232 XR |
| 3,457,430 | 7/1969 | Samuelson | 307—216 XR |

DONALD D. FORRER, Primary Examiner

S. T. KRAWCZEWICZ, Assistant Examiner

U.S. Cl. X.R.

328—99, 110, 117, 155; 307—289, 216, 247, 232